April 29, 1952 — N. C. STOREY — 2,594,695
HINGED SECTION POWER STEERED VEHICLE
Filed Dec. 1, 1947
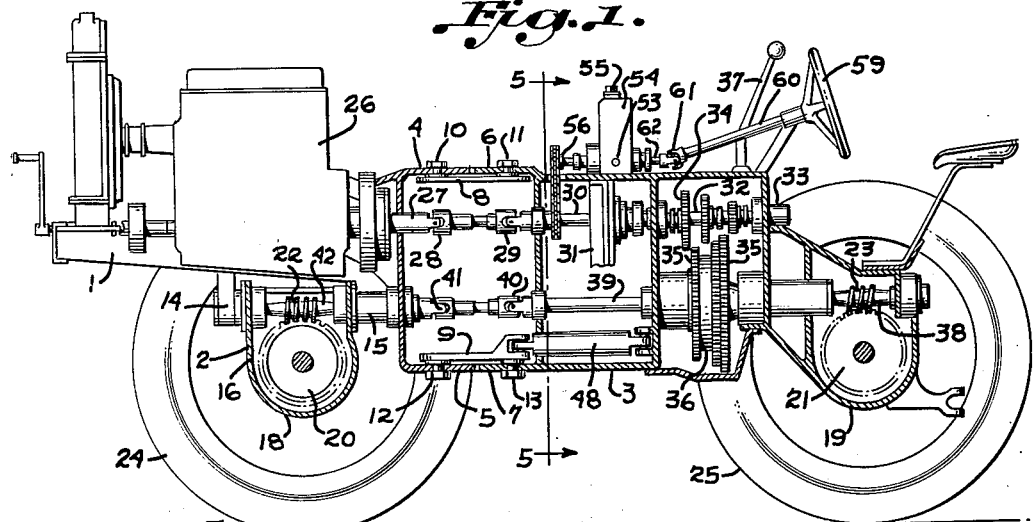
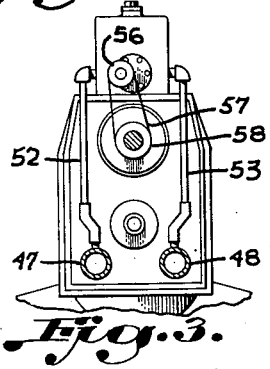
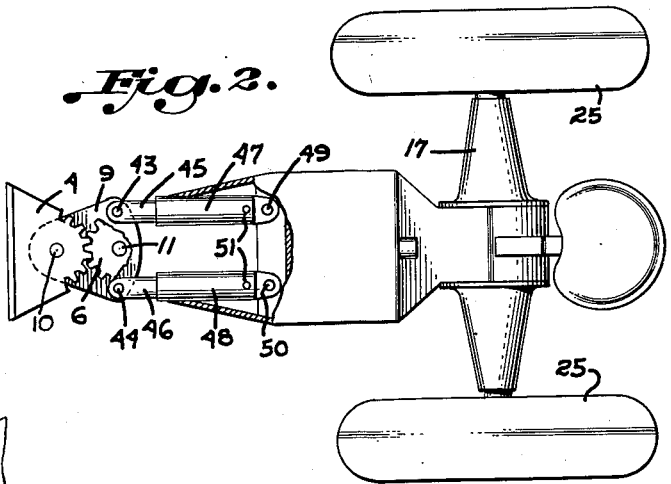
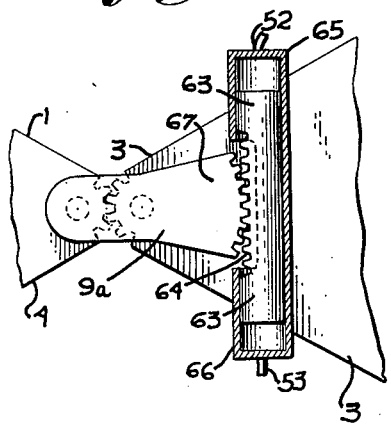
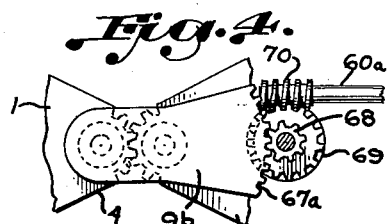
Inventor
Norman C. Storey
By Young, Emery + Thompson
Attorneys Patented Apr. 29, 1952

2,594,695

UNITED STATES PATENT OFFICE 2,594,695

HINGED SECTION POWER STEERED VEHICLE

Norman C. Storey, Miami, Fla.

Application December 1, 1947, Serial No. 789,118

7 Claims. (Cl. 180—79.2)

This invention relates to hinging couplings for connecting two units together where considerable relative swinging movement between the units is required and in which power is transmitted from one unit to the other through a shaft containing a pair of universal joints.

Hinged couplings are employed in wheeled vehicles where two units are connected for pivotal or swinging movement about a substantially vertical axis relatively to each other and power for driving the units or for other purposes is transmitted from one unit to another. One application of such couplings is in a tractor such as described in my prior Patent No. 1,957,917 and in my Patent No. 2,426,652.

In the couplings developed heretofore, difficulty has been encountered in obtaining both maximum pivoting or hinging movement between the connected units and maximum efficiency in the transmission of power from one unit to the other during hinging movement and while the units are in their extreme hinged or pivoted positions.

An object of this invention is to provide a hinged coupling between units, in which power is transmitted from one unit to the other and in which the disadvantages of the prior art are avoided.

Another object of this invention is to provide a hinging coupling between two units in which each unit has a toothed sector rigid therewith meshing with a similar toothed sector of the other unit and the units are connected by a link pivotally connected to each unit about a pivot concentric with the center of the toothed sector thereof.

A further object of this invention is to provide a hinging coupling between two units in which each unit has a toothed sector rigid therewith meshing with a similar toothed sector of the other unit and the units are connected by a link pivotally connected to each unit about a pivot concentric with the center of the toothed sector thereof, and in which a power transmitting shaft of one unit is connected with a similar shaft of the other unit through double universal joints, the pivoting axis of one universal joint coinciding with the vertical axis of the toothed sector of one unit and the pivoting axis of the other universal joint coinciding with the vertical axis of the toothed sector of the other unit.

Still another object of this invention is to provide a hinging coupling between two units in which each unit has a toothed sector rigid therewith meshing with a similar toothed sector of the other unit and the units are connected by a link pivotally connected to each unit about a pivot concentric with the center of the toothed sector thereof, and in which means is carried by one unit for pivoting the link relative thereto and causing relative swinging movement between the toothed sectors and units.

With these and other objects in view which will appear more fully hereinafter, the present invention resides in the parts and combinations illustrated in the drawings and set forth in the following description.

In the drawings:

Figure 1 is an elevational view of a tractor embodying the principles of the present invention with parts of the housing cut away to illustrate the gearing and coupling connections;

Figure 2 is a fragmentary plan view of a tractor with the motor removed and part of the forward and rear frames cut away;

Figure 3 is a more or less diagrammatic representation of a modified form of steering mechanism; and Figure 4 is a view similar to Figure 3 showing another modified form of steering mechanism.

Figure 5 is a vertical sectional view taken on line 5—5 of Figure 1 forward of the hydraulic control showing the connections from the steering control to the steering cylinders.

As shown more particularly in Figures 1 and 2, a tractor constructed according to the present invention comprises a frame or chassis having a front section or unit 1 supported on a truck frame 2 and a rear section or unit 3. The front and rear sections or units 1 and 3 are joined together by a coupling embodying the feature of the present invention.

As shown in Figures 1 and 2, the upper and lower plates 4 and 5 of the rear portion of the front unit 1 and the upper and lower plates 6 and 7 of the front portion of the rear unit are in the form of toothed sectors with sectors 4 and 5 meshing with sectors 6 and 7 respectively.

In order to retain the toothed sectors of the front unit in mesh with the toothed sectors of the rear section, links 8 and 9 are provided. Link 8 is connected at its forward end by pivot 10 to the center of toothed sector 4 and at its rear end by pivot 11 to the center of toothed sector 6. Similarly, link 9 is connected at its forward end by pivot 12 to the center of toothed sector 5 and at its rear end by pivot 13 to the center of toothed sector 7.

It will be noted that pivot pins 10 and 12 are in vertical alignment and that pins 11 and 13 are in vertical alignment. Also, it should be noted that the toothed sectors are of substantially the same radius. With this arrangement, hinging or pivoting of the two units 1 and 3 will take place about the two vertical pivotal axes, passing through pins 10, 12 and 11, 13 respectively. Trunnion bearings 14 and 15 are provided for supporting the front section 1 on the truck frame 2.

As illustrated, truck frame 2 is fitted with axle housing 16 whereas the rear section is supported on axle housing 17. It should be understood that the axles in these housings are operatively connected by means of suitable differentials contained respectively in housings 18 and 19 associated with the axle housings.

Since the details of these differentials are well known in the art, they are not further illustrated herein. The differentials are driven by worm gears 20 and 21, which mesh with worms 22 and 23, respectively.

Truck frame 2 supporting the front section 1 is carried on the two drive wheels 24 and the rear section 3 is carried on the two rear drive wheels 25. Both sets of wheels 24 and 25 are driven by a motor 26 through a suitable transmission as described in my Patent No. 1,957,917. This transmission is driven by the rearwardly extending drive shaft 27 of motor 26.

Shaft 27 is coupled by a double universal joint 28—29 to a shaft 30 on the rear section, it being noted that the universal joint 28 is so disposed with respect to the axis of pivot 10, 12 and universal joint 29 is so disposed relative to the axis of pivot 11, 13 that the shaft 30 will always be rotated regardless of the position of the sections with respect to each other.

Shaft 30 which may be termed the driving shaft terminates in a clutch, the housing of which is designated 31 and which connects the shaft 30 to a driven shaft 32. The clutch may be of any usual construction and may be operated by an actuating lever, not shown. The end of the shaft 32 may be used as a power outlet and for this purpose may be constructed for coupling to any suitable device to be driven as disclosed in my above-mentioned Patent No. 1,957,917. A suitable cover designated by reference character 33 may be provided for encasing the power take-off end of shaft 32.

Slidably mounted on the shaft 32 are transmission gears 34 adapted to mesh with gears 35 on a differential housing 36 having an axis parallel to the shaft 32. The gears 34 may be shifted by means of a lever 37 in order to obtain various gear ratios to govern the transmission between the shaft 32 and the differential housing 36.

Housing 36 has mounted therein a differential gearing, the details of which are shown and described in my Patent No. 1,957,917. Extending rearwardly from the differential housing is a propeller shaft 38 which carries the worm 23 and extending forwardly from the differential housing is another propeller shaft 39 which is connected through a double universal joint 40, 41 to the propeller shaft 42 carrying the worm 22 meshing with the worm gear 20. By this arrangement, the motion transmitted to the differential housing 36 is communicated and distributed to the shafts 38 and 39 and the differential provides a flexible connection permitting the shafts to rotate at different speeds with respect to each other. A suitable clutch may be associated with the differential within the housing 36 as described in my above-mentioned Patent No. 1,957,917 to lock the differential which may be desirable when driving over terrain in which the traction between the driving wheels and the surface over which they are traveling is low and irregular.

As hereinbefore indicated, the front section 1 is supported on the truck frame 2 by means of longitudinally extending trunnion bearings 14 and 15 which with the universal joints permit side tipping of the front wheels in a manner similar to that which is set forth in my prior Patent No. 1,623,214.

Steering of the tractor is effected by causing pivoting movement of the front and rear units simultaneously about the two vertical axes, the first passing through pivots 10—12 and the second passing through the pivots 11—13. The present invention differs primarily from that of my prior Patent No. 1,957,917 and from that of my prior Patent No. 2,426,652 in that pivoting of the front and rear units takes place about separate spaced pivoting axes 10—12 and 11—13 instead of a single axis.

As illustrated in Figures 1 and 2, link 9 is in the form of a plate having pins 43 and 44 secured on opposite sides of a line passing through the centers of pivots 12 and 13. Plungers 45 and 46 are pivoted at their outer ends to pins 43 and 44 and are slidably mounted in the open end of cylinders 47 and 48. The outer or closed ends of cylinders 47 and 48 are pivotally connected by pins 49 and 50 to a rigid portion of the rear unit 3.

Adjacent the closed end of each cylinder there is provided a port 51 for the inflow and outflow of actuating fluid supplied through conduits 52 and 53 from a hydraulic control distributing device 54 mounted on the rear unit 3. Conduits 52 and 53 include flexible portions to permit movement of cylinders 47 and 48 relative to the frame. The hydraulic pump, control and distributing device comprises an oil reservoir having a filler opening closed by a plug 55. The hydraulic pump, control and distributing device is identical to that described in my Patent No. 2,426,652 mentioned hereinbefore. As in this prior patent, the pump shaft carries a sprocket 56 connected by a chain 57 to a sprocket 58 on shaft 30.

A steering wheel 59 is provided and operates a valve in the hydraulic steering control 54 through steering column 60, universal joint 61 and shaft 62 which passes through a packing gland, as in my Patent No. 2,426,652. Thus, depending upon the position of steering wheel 59 and the valve controlled thereby, liquid will flow to one of the cylinders 47, 48 and be discharged from the other, or the flow to and from both cylinders will be shut off.

Hydraulic steerage of the tractor may be effected with means other than those just described. For instance, as indicated in Fig. 3, two plungers or pistons 63 connected by a rack 64 or an integral structure may be disposed in cylinders 65 and 66 connected by conduits 52 and 53 to the control and distributing device. Rack 64 meshes with a toothed sector 67 formed on the rear portion of link 9a.

In some instances, manual steering can be employed. A construction suitable for manual steering is shown in Figure 4 in which a toothed sector 67a formed on the rear link 9b is meshed with a pinion 68 fixed to a shaft carrying a worm wheel 69 driven by a worm 70 on a steering shaft 60a.

In all forms of the present invention, steering can be easily effected by causing the link 9—9a—9b to be displaced relative to the rear section 3 about the pivot 13. Due to the toothed connection between the toothed sectors 4, 6 and 5, 7, relative rotary movement between the links 9, etc. and the rear unit 3 will cause the units 1 and 3 to pivot about their respective axes 10, 12 and 11, 13, thereby obtaining a maximum steering movement for a relatively small rotary movement between the links and the rear unit.

Due to the location of the universal joints in the drive shafts in alignment with the axes 10, 12 and 11, 13, the transmission of power from unit 1 to unit 3 can be satisfactorily accomplished regardless of the position of units 1 and 3 with respect to each other.

The hydraulic pump, valve and means of operation may be of any conventional type and also the tractor's transmission may be arranged to drive the tractor the same speeds in either direction.

Also, the rear section may be supported for tilting movement on a truck frame similar to truck frame 2. In this instance, however, the front section would be rigidly mounted on the axle housing supporting the same.

From the foregoing description, it will be apparent that the present invention provides a tractor having a simple, easily controlled steering mechanism and which is highly maneuverable.

I claim:

1. In a hinged coupling comprising two sections, each section being symmetrical about a horizontal center line running through the said hinged coupling, each section having an upper and lower member provided with gear teeth arranged about a vertical pivoting axis passing through said center line, the said pivoting axis of the said upper and lower members of each section being concentric with each other, a linkage connecting the two said sections together with the gear teeth of the said upper and lower members meshing with each other and with the pivoting axis of one section spaced from that of the other, said linkage being pivoted to said sections on the said vertical pivoting axes, thus permitting a swinging movement of said sections about the said vertical pivoting axes with said teeth meshing and keeping the two said sections in the proper relation with each other, and steering means operatively connecting the linkage and one of said sections, said steering means including an element mounted on said last mentioned section and movable with respect to said last mentioned section, and means connecting said movable element to said linkage at a region of the latter eccentric with respect to the pivoting axis connecting the linkage with said last mentioned section on which the element is movably mounted so that movement of said element relative to said last mentioned section will effect relative pivotal movement of the linkage and said last mentioned section and thus cause the two sections to change their positions with relation to each other.

2. In a tractor comprising two pivotally connected sections, each section having an upper and lower member provided with gear teeth arranged about a vertical pivoting axis, a linkage connecting said sections, said linkage being pivoted to each section about said vertical axis, said vertical pivoting axes being laterally spaced, said linkage connecting the two sections together with the gear teeth of the upper members meshing with each other and with the gear teeth of the lower members meshing with each other, and steering means operatively connecting the linkage and one of said sections, said steering means including an element mounted on said last mentioned section and movable with respect to said last mentioned section, and means connecting said movable element to said linkage at a region of the latter eccentric with respect to the pivoting axis connecting the linkage with said last mentioned section on which the element is movably mounted so that movement of said element relative to said last mentioned section will effect relative pivotal movement of the linkage and said last mentioned section to effect swinging movement of said sections about said pivoting axes.

3. In a tractor comprising two pivotally connected sections, each section having an upper and lower member provided with gear teeth arranged about a vertical pivoting axis, a linkage connecting said sections, said linkage being pivoted to each section about said vertical axis, said vertical pivoting axes being laterally spaced, said linkage connecting the two sections together with the gear teeth of the upper members meshing with each other and with the gear teeth of the lower members meshing with each other, said linkage having a gear toothed sector thereon concentric with the pivoting axis connecting the linkage with one section, and means movably mounted on said last mentioned section having a toothed portion in mesh with said toothed sector and cooperating therewith for effecting relative pivotal movement of the linkage and said last mentioned section upon movement of said movably mounted means, to effect swinging movement of said sections about said pivoting axes.

4. In a tractor comprising two pivotally connected sections, each section having an upper and lower member provided with gear teeth arranged about a vertical pivoting axis, a linkage connecting said sections, said linkage being pivoted to each section about said vertical axis, said vertical pivoting axes being laterally spaced, said linkage connecting the two sections together with the gear teeth of the upper members meshing with each other and with the gear teeth of the lower members meshing with each other, at least one hydraulically actuated element movably mounted on one of said sections, and means connecting said movable element to said linkage at a region of the latter eccentric with respect to the pivoting axis connecting the linkage with said section on which the element is movably mounted so that movement of said element relative to said last mentioned section will effect relative pivotal movement of the linkage and said last mentioned section to effect swinging movement of said sections about said pivoting axes, and steering mechanism for manually controlling the supply of hydraulic medium to said hydraulically actuated means to effect steering of said tractor.

5. In a hinged coupling comprising two sections, each section being symmetrical about a horizontal center line running through the said hinged coupling, each section having an upper and lower member provided with gear teeth arranged about a vertical pivoting axis passing through said center line, the said pivoting axis of the said upper and lower members being concentric with each other, a linkage connecting the two said sections together with the gear teeth of the said upper members meshing with each other and with the gear teeth of the lower members meshing with each other, said linkage being pivoted to said sections on the said vertical pivoting axes, thus permitting a swinging movement of said sections about the said vertical pivoting axes with said teeth meshing and keeping the two said sections in the proper relation with each other, a pair of hydraulic units, each unit comprising a cylinder element open at one end, and a piston element slidably mounted in said cylinder and projecting through said open end, means for pivoting one end of one element of each unit to one of said sections, means for pivoting the outer end of the other element of each unit to said linkage on opposite sides of a line passing through the pivoting axes about which said linkage is pivoted to said sections, and means for controlling the supply and discharge of a fluid under pressure to said cylinders to effect pivoting of said sections with respect to the linkage and to each other.

6. In a hinged coupling comprising two sections, each section being symmetrical about a horizontal center line running through the said hinged coupling, each section having an upper and lower member provided with gear teeth arranged about a vertical pivoting axis passing through said center line, the said pivoting axis of the said upper and lower members being concentric with each other, a linkage connecting the two said sections together with the gear teeth of the said upper members meshing with each other and with the gear teeth of the lower members meshing with each other, said linkage being pivoted to said sections on the said vertical pivoting axis, thus permitting a swinging movement of said sections about the said vertical pivoting axes with said teeth meshing and keeping the two said sections in the proper relation with each other, a double acting hydraulically actuated member comprising a cylinder fixed to one of said sections and a plunger slidably mounted therein, means connecting said plunger to said linkage at a region spaced radially outwardly of the pivoting axis connecting the linkage to the section carrying the cylinder, and means for controlling the supply and discharge of fluid under pressure to the ends of said cylinder to displace the piston therein and effect pivoting movement of the linkage with respect to the section carrying said cylinder to cause the two sections to change their positions with respect to each other.

7. In combination, a hinged coupling connecting two sections of an articulate vehicle chassis in which the two said sections are held in the proper relation to each other by interexchanging teeth, a linkage pivoted to said sections to permit swinging movement with relation to each other, and steering means operatively connecting the linkage and one of said sections, said steering means including an element mounted on said last mentioned section and movable with respect to said last mentioned section, and means connecting said movable element to said linkage at a region of the latter eccentric with respect to the pivoting axis connecting the linkage with said last mentioned section on which the element is movably mounted so that movement of said element relative to said last mentioned section will effect relative pivotal movement of the linkage and said last mentioned section, and power means carried by said last mentioned section for moving said movable element.

NORMAN C. STOREY.

REFERENCES CITED

The following references are of record in the file of this patent:

UNITED STATES PATENTS

| Number | Name | Date |
|---|---|---|
| 1,872,714 | Farley | Aug. 23, 1932 |
| 1,957,917 | Storey | May 8, 1934 |
| 2,192,175 | Ballard | Mar. 5, 1940 |
| 2,426,652 | Storey | Sept. 2, 1947 |

FOREIGN PATENTS

| Number | Country | Date |
|---|---|---|
| 441,480 | Great Britain | Jan. 16, 1936 |